(12) United States Patent
Iida (10) Patent No.: US 6,175,693 B1
(45) Date of Patent: Jan. 16, 2001

(54) CAMERA PROVIDED WITH PHOTOMETRY DEVICE

(75) Inventor: Yoshikazu Iida, Tokyo (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/372,834

(22) Filed: Aug. 12, 1999

(30) Foreign Application Priority Data

Aug. 12, 1998 (JP) .................................................. 10-227817

(51) Int. Cl.⁷ .............................. G03B 7/00; G03B 13/26
(52) U.S. Cl. ........................ 396/121; 396/225; 396/234
(58) Field of Search .................................. 396/225, 236, 396/121, 122, 123, 106, 233, 234

(56) References Cited

U.S. PATENT DOCUMENTS

| | | | |
|---|---|---|---|
| 4,887,121 | 12/1989 | Pritchard | 396/225 |
| 5,016,039 | 5/1991 | Sosa et al. | 396/225 |
| 5,266,983 | * 11/1993 | Takagi | 396/225 |
| 5,278,602 | * 1/1994 | Honma et al. | 398/106 |
| 5,289,225 | 2/1994 | Hirai | 396/122 |
| 5,325,147 | 6/1994 | Kirigaya et al. | 396/67 |
| 5,617,175 | 4/1997 | Asakura et al. | 396/225 X |
| 5,687,407 | 11/1997 | Iwasaki et al. | 396/225 |
| 5,740,481 | 4/1998 | Iwasaki et al. | 396/225 |

FOREIGN PATENT DOCUMENTS

| | | |
|---|---|---|
| 341921 | 11/1989 | (EP) . |
| 10253449 | 9/1988 | (JP) . |
| 3-15726 | 1/1991 | (JP) . |
| 5-340804 | 12/1993 | (JP) . |
| 6-160936 | 6/1994 | (JP) . |
| 6281994 | 10/1994 | (JP) . |
| 2634897 | 4/1997 | (JP) . |

OTHER PUBLICATIONS

Patent Abstracts of Japan—JP 6–160936.
Patent Abstracts of Japan—JP 5–340804.
Patent Abstracts of Japan—JP 3–15726.
Patent Abstracts of Japan, vol. 14, No. 054 (P–0999), dated Jan. 31, 1990, family menber Japanese Patent Document 01 280732 (NIKON), published Nov. 10, 1989.

* cited by examiner

*Primary Examiner*—W. B. Perkey
(74) *Attorney, Agent, or Firm*—Greenblum & Bernstein, P.L.C.

(57) ABSTRACT

A camera is provided with a photometry device that is used to detect a brightness of an object, a colorimetry device that detects a color of the object, and a controller that determines an exposure value in accordance with output of the photometry device. The controller compensates the exposure value in accordance with the color of the object detected by the colorimetry device.

6 Claims, 11 Drawing Sheets

CAMERA PROVIDED WITH PHOTOMETRY DEVICE

BACKGROUND OF THE INVENTION

The present invention relates to a camera provided with a photometry device.

Recently, cameras are provided with photometry devices for automatic exposure control. In particular, as a photometry device provided in a camera, a reflection type photometry device is widely used. The reflection type photometry device is constructed to receive light reflected by an object through an observation optical system of a camera, and measure an amount of light using a photo-sensitive element to detect brightness of the object. Based on thus detected brightness of the object, an exposure value (commonly known as an Ev value) is determined, and then, in accordance with a predetermined algorithm, exposure parameters (i.e., a shutter speed and an aperture value) are determined. This type of photometry device, however, does not detect reflectance of an object, and therefore, the exposure value, and thus, the exposure control parameters are calculated on assumption that the light reflectance is a predetermined fixed value, for example, 18%.

Therefore, when an object is a whitish subject whose light reflectance is greater than 18%, the brightness is detected to be higher than its actual brightness, and accordingly, such an object tends to be photographed in underexposed condition. When an object is a dark object whose light reflectance is lower than 18%, the brightness thereof is detected to be lower than the actual brightness, and accordingly, such an object tends to be photographed in an overexposed condition.

In order to avoid the above defects, a camera provided with an exposure correcting unit has been known. In such a camera, a photographer can modify the exposure value so that photographing is performed in a slightly overexposed condition when a whitish object is to be photographed, and for a dark object, the photographer can modify the exposure value so that photographing is performed in a slightly underexposed condition. By performing such an exposure operation with modifying the exposure value, the above-mentioned problems can be suppressed.

However, differences in the light reflectance of the object also occurs due to differences in the color of the object. For example, a yellow object, whose light reflectance is relatively high, tends to be photographed in a slightly underexposed condition, and a blue object, whose light reflectance is relatively low, tends to be photographed in a slightly overexposed condition.

Accordingly, in order to execute exposure correction taking differences in the color of the object into account, the photographer is required to recognize a relationship between the color and light reflectance of the object to optimize the exposure value using the exposure correction unit. However, it is practically impossible to require photographers to perform such exposure correction. Further, if such a correction operation is required, cameras become unsuitable for automatic photographing.

SUMMARY OF THE INVENTION

It is therefore an object of the present invention to provide camera provided with an improved exposure correction unit which automatically corrects exposure parameters to enable photographing at an optimum exposure condition regardless of differences in the color of objects.

For the above object, according to the invention, there is provided a camera, which is provided with: a photometry device that is used to detect brightness of an object; a colorimetry device that detects a color of the object; and a controller that determines an exposure value in accordance with output of the photometry device, the controller compensating the exposure value in accordance with the color of the object detected by the colorimetry device.

Since the exposure value is compensated in accordance with the photometry result and colorimetry results, an optimized exposure value can be obtained.

Optionally, the controller includes a storing device that stores a plurality of compensation values corresponding to a plurality of colors, and the controller compensates the exposure value by adding a compensation value corresponding to the color of the object stored in the storing device.

The compensation values are stored in the memory, and are referred to after the color has been determined. Correction of the compensation values can be dealt with relatively easily, and the algorithm for determining the correction value needs not be modified.

Optionally, the camera may further include a distance measuring device which detects a distance to the object at a predetermined point within a photographing frame, the photometry device detects the brightness of the object at an area, within the photographing frame, which includes the predetermined point, and the colorimetry device detects the color of the object at an area, within the photograhing frame, which includes the predetermined point.

Since the distance measuring point, a target point with respect to which the photometry and colorimetry operations are performed correspond to each other, the exposure value can be optimized in accordance with the photographer's intent.

Alternatively, the camera may include a distance measuring device capable of detecting a distance to the object at a plurality of distance measuring points defined within a photographing frame of the camera. In this case, the photometry device may be capable of detecting the brightness of the object at any one of areas, within the photographing frame, which respectively include the plurality of distance measuring points, and the colorimetry device may be capable of detecting the color of the object at any one of areas, within the photograhing frame, which respectively include the plurality of distance measuring points. The distance to the object may be detected with respect to selected one of the plurality of distance measuring points, the exposure value being detected at an area corresponding to the selected one of the plurality of distance measuring points, and the color of the object being detected at an area corresponding to the selected one of the plurality of distance measuring points.

Still optionally, the colorimetry device may include: a plurality of photometric elements for measuring amount of received light having different wavelength ranges; and a color determining system that determines the color based on the light amount values detected by the plurality of photometric elements.

According to another aspect of the invention, there is provided an exposure control system for a camera, which is provided with: a photometry device that is used to detect brightness of an object; a colorimetry device that detects a color of the object; and a controller that determines an exposure value in accordance with output of the photometry device, the controller compensating the exposure value in accordance with the color of the object detected by the colorimetry device.

DETAILED DESCRIPTION OF THE EMBODIMENTS

An embodiment of the invention and a modification thereof will be described hereinafter with reference to the accompanying drawings.

Figure 1:
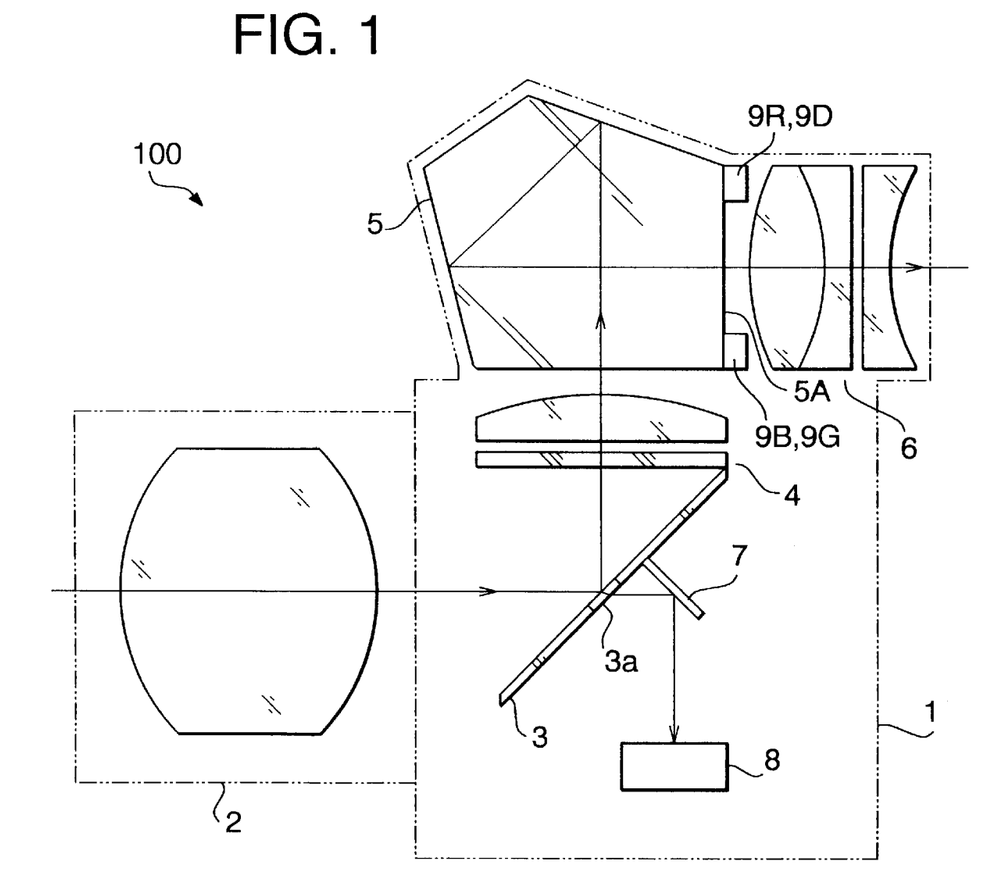
FIG. 1 schematically shows an arrangement of an optical system of a camera according to an embodiment of the invention.

FIG. 1 schematically shows a cross sectional view of a camera 100 to which the present invention is applicable. The camera 100 is a single lens reflex camera having a body 1, a photographing lens 2 detachably attached to the body 1, a quick-return mirror 3, a focusing plate 4, a pentaprism (or pentamirror) 5, and an eyepiece optical system 6. A part of the quick-return mirror 3 is formed as a half-mirror part 3a. Part of light passed through the photographing lens 2 passes through the half-mirror part 3a, reflected by a mirror 7 and is incident on a distance detecting unit 8.

On the pentaprism 5, four photometric elements 9D, 9R, 9G and 9B are arranged at four points on the surface 5A facing the eyepiece optical system 6. Each of the photometric elements 9D, 9R, 9G and 9B is arranged to receive a part of the light from an object.

Figure 2A:
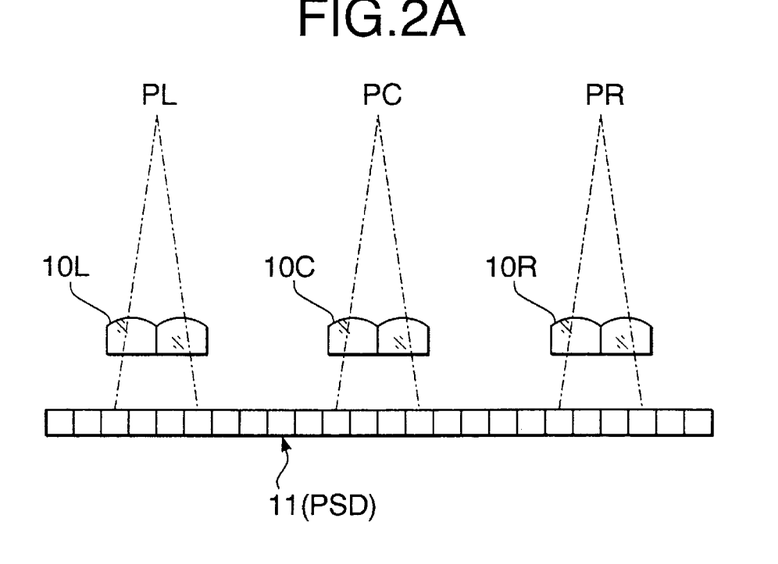
FIG. 2A schematically shows a structure of a distance measuring system employed in the camera shown in FIG. 1
Figure 3A:
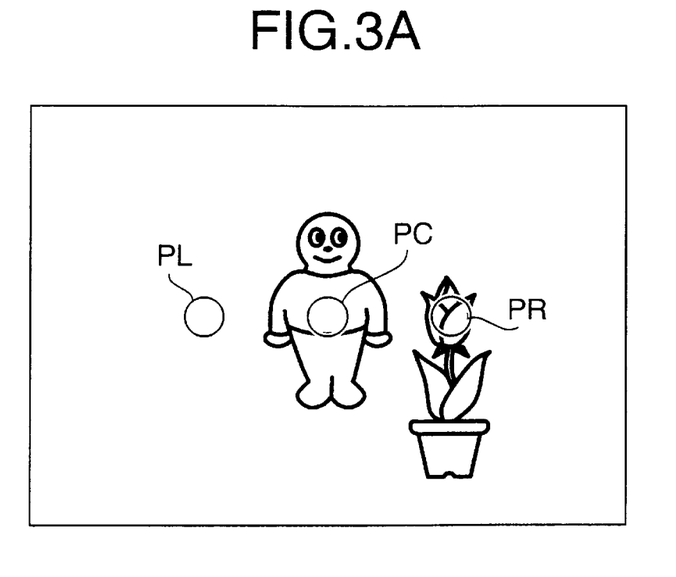
FIG. 3A shows distance measuring points of each of the distance measuring systems shown in FIG. 2A.

FIG. 2A schematically shows a structure of the distance measuring unit 8. The distance measuring unit 8 is a passive type multi-point distance measuring unit which is constituted to detect object distances at three points within a photographing frame; a center position PC, a left position PL and a right position PR (see FIG. 3A). Dual type lenses 10C, 10L and 10R are provided so as to receive light corresponding to the points PC, PL and PR. Further, a PSD (Position Sensing Device) 11 is provided to receive light passed through the dual type lenses 10C, 10L and 10R. Based on the output of the PSD 11, object distances corresponding to the points PC, PL and PR are detected. An example of such a distance measuring unit is disclosed in U.S. Pat. No. 5,397,887, teachings of which are incorporated herein by reference.

Figure 2B:
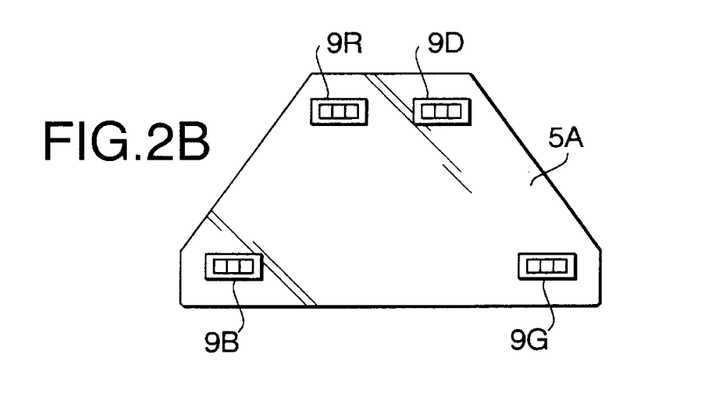
FIG. 2B shows an arrangement of photometry elements.

The photometric elements 9D and 9R are arranged at upper portions on the eyepiece optical system side surface 5A of the pentaprism 5, and the photometric elements 9G and 9B are arranged at lower portions on the surface 5A of the pentaprism 5 as shown in FIG. 2B.

Figure 2C:
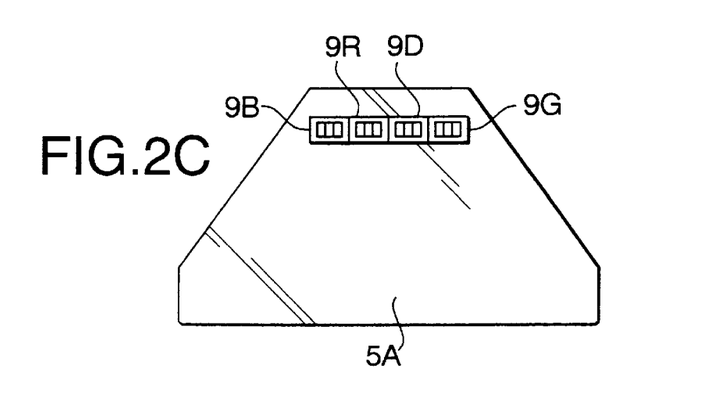
FIG. 2C shows an alternative arrangement of the photometry elements.

It should be noted that the arrangement of the photometric elements 9D, 9R, 9G and 9B shown in FIG. 2B is intended to make use of a surplus area within a finder frame. According to the arrangement shown in FIG. 2B, a light receiving surface of each photometric element can be made larger and the light receiving amount can be increased. If the light amount needs not be made so great, the photometric elements 9D, 9R, 9G and 9B may be made compact and collected at one portion as shown in FIG. 2C.

Figure 3B:
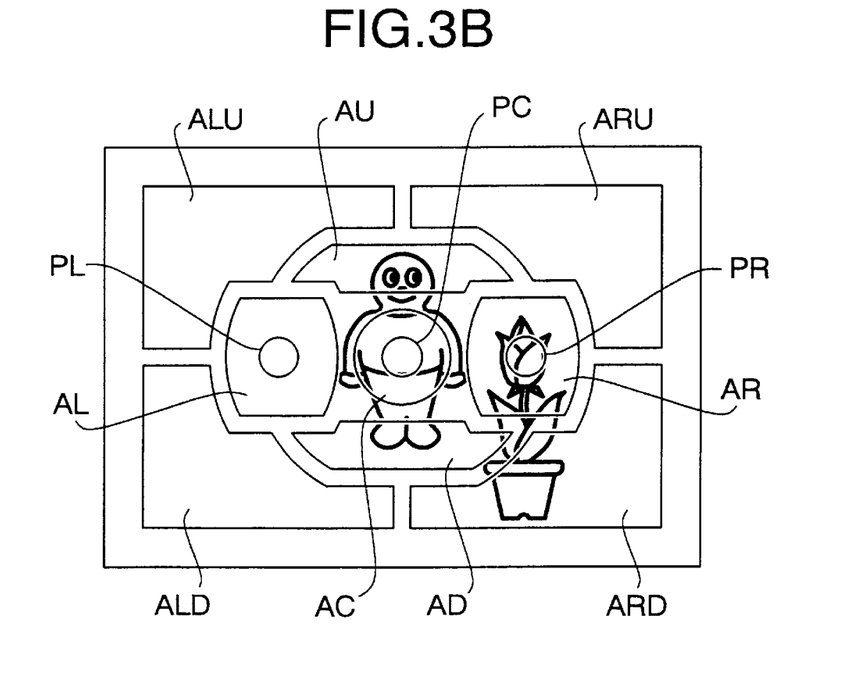
FIG. 3B shows brightness measuring areas of each of the photometry elements shown in FIG. 2B or 2C.

Each of the photometric elements 9D, 9R, 9G, and 9B is provided with imaging lens, and configured to receive light from a plurality of areas. Specifically, as shown in FIG. 3B, an objective area (which corresponds to the photographing frame) is divided into nine areas: a central area AC; a central left area AL; a central right area AR; an upper area AU; an lower area AL; an upper left area ALU; an upper right area ARU; a lower left area ALD; and a lower right area ARD. Each of the photometric elements 9D, 9R, 9G, and 9B is configured to detect the brightness of the nine areas. For this purpose, each photometric element may be formed as a photo diode (e.g., one known as a planar type) having nine separated light receiving areas.

The three distance measuring points PC, PL and PR are arranged to be included within the three light receiving areas AC, AL and AR, respectively.

Figure 4:
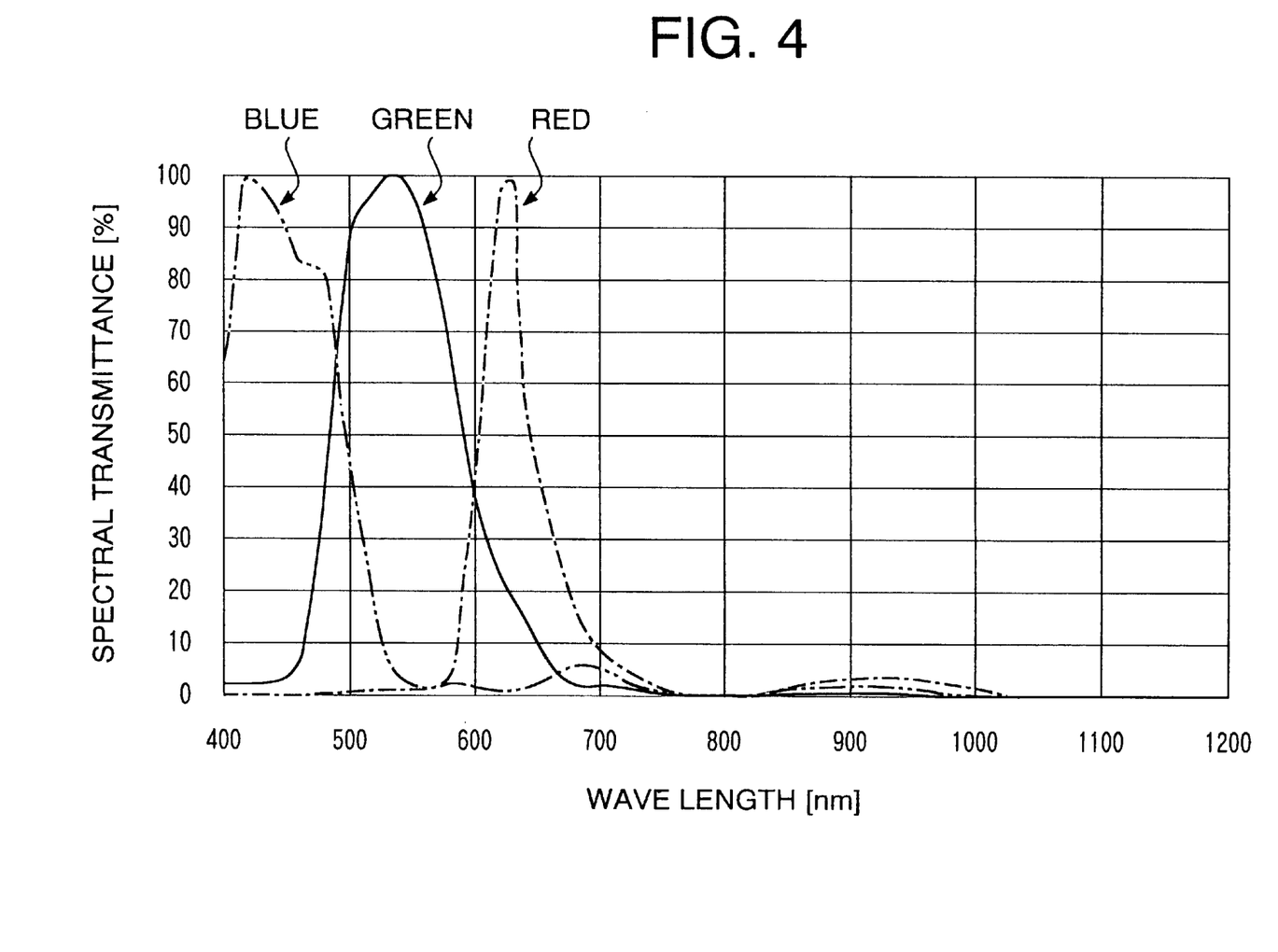
FIG. 4 is a graph showing spectral transmittance characteristics of color filters provided onto the photometry elements shown in FIG. 2B or 2C.

Further, the photometric element 9B is provided with a blue filter; the photometric element 9G is provided with a green filter; and the photometric element 9R is provided with a red filter. The photometric element 9D is not provided with a color filter. The spectral transmittance properties of the blue, red, and green filters provided to the respective photometric elements 9B, 9G and 9R are shown in FIG. 4. As shown in FIG. 4, the blue, red and green filters have approximately 420 nm, 530 nm, and 630 nm of transmittance peak wavelengths, respectively.

Figure 5:
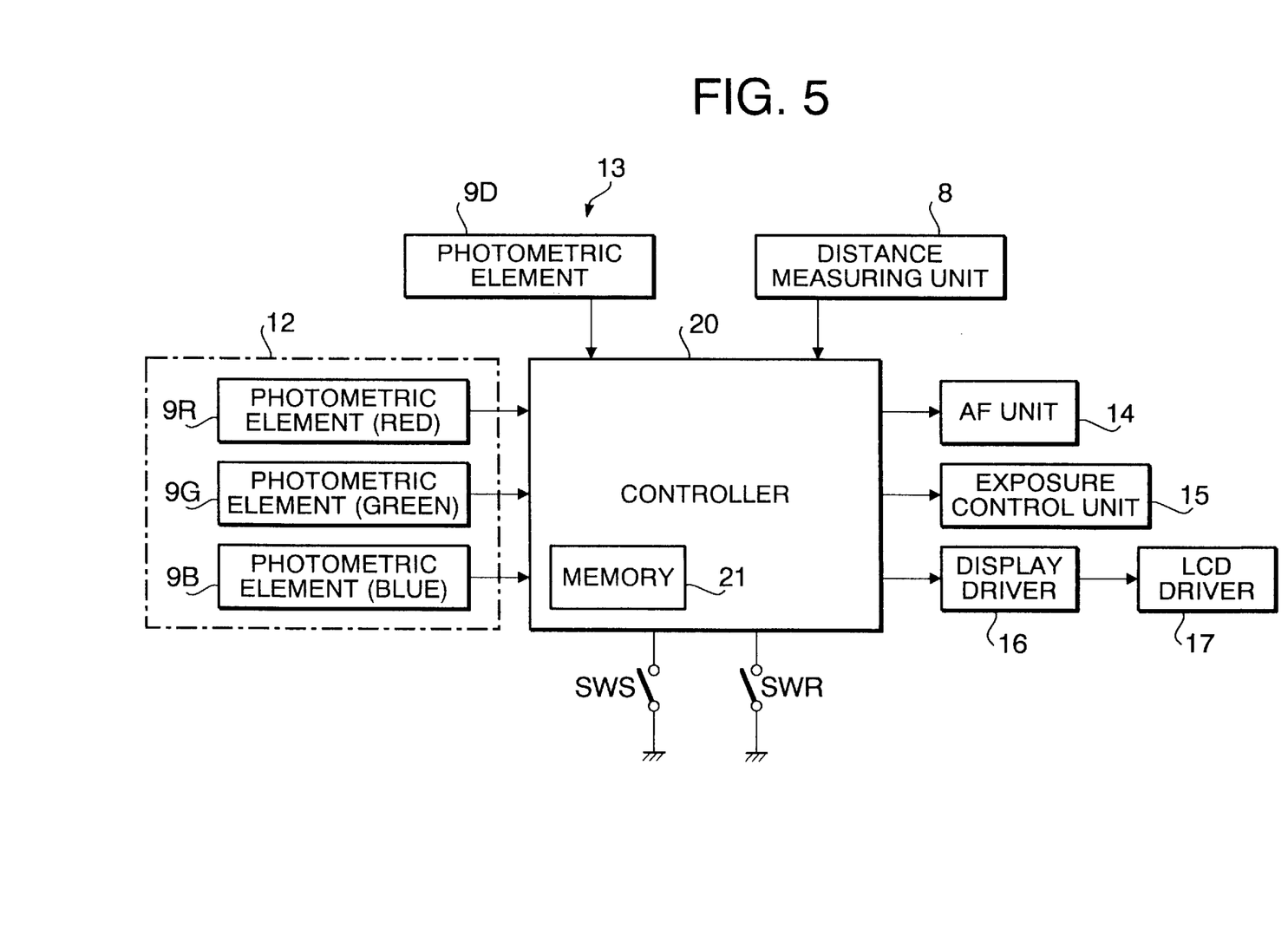
FIG. 5 is a block diagram of a main part of a control system of the camera.

FIG. 5 is a block diagram showing a main part of a control system of the camera 100. The photometric elements 9R, 9G, and 9B constitute a colorimeter 12, and output signals representing photometric values of respective color components to a controller 20. The photometric element 9D is used as an independent photometry device 13 which outputs the measured photometric values to the controller 20. The output of the multi-point distance measuring unit 8 is also transmitted to the controller 20 as a detected distance value.

Status of a photometry switch SWS and a shutter release switch SWR is detected by the controller 20. The photometry switch SWS is turned ON in response to half-depression of a release button of the camera 100, and the shutter release switch SWR is turned ON in response to full-depression of the release button.

When the photometry switch SWS is turned ON, based on the outputs of the colorimeter 12, photometer 13, and multi-point distance measuring unit 8, in accordance with a predetermined algorithm, the controller 20 drives an AF (auto focus) unit 14 and an exposure control unit 15. The controller 20 also controls the display driver 16 to display the distance value and photometric value on an LCD (liquid crystal) display 17. It should be noted that the controller 20 includes a memory 21 for storing photometric correction values ΔEV, which will be described later.

The photographing operation of the camera 100 will be described with reference to the flowcharts.

Figure 6:
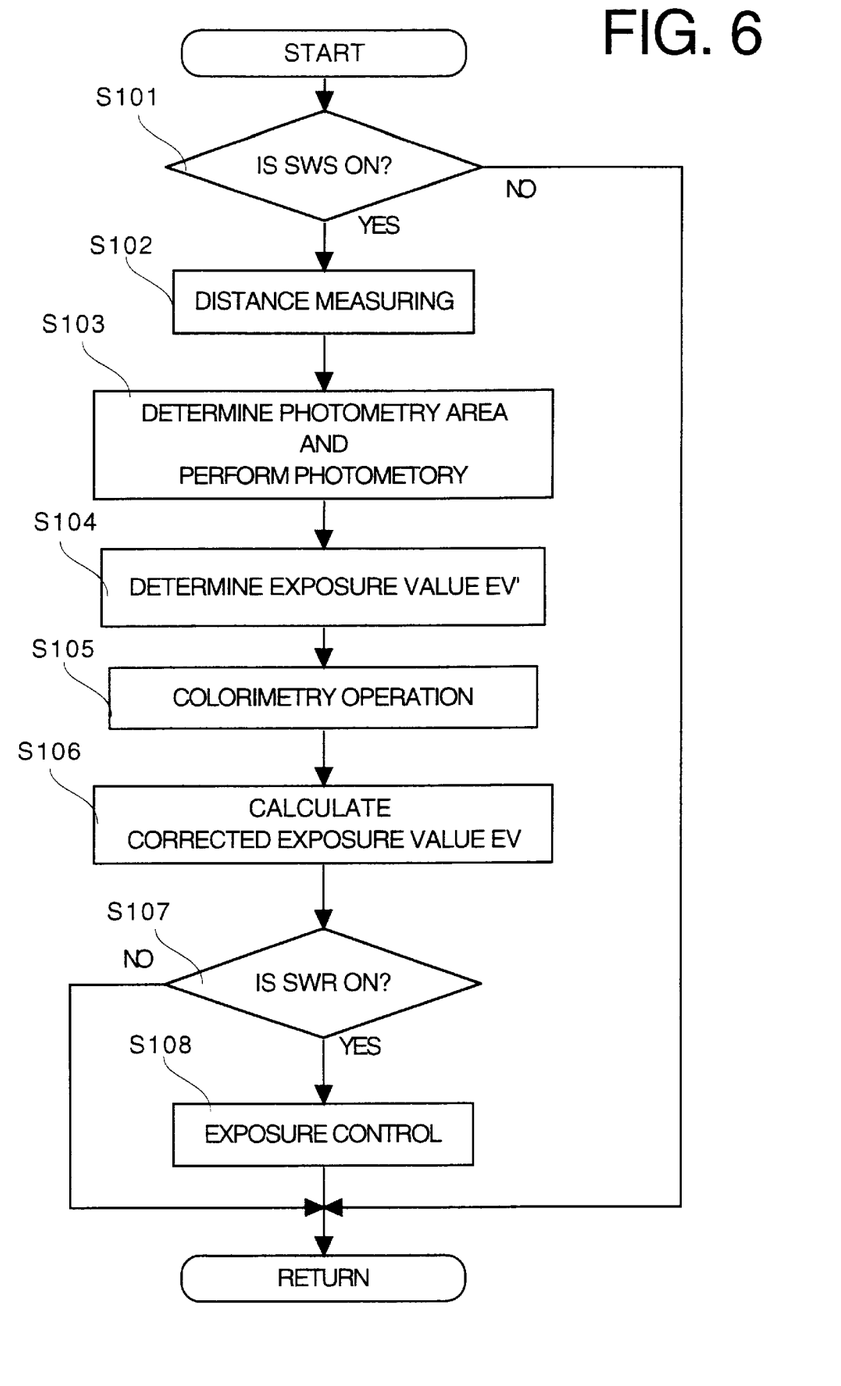
FIG. 6 a flowchart illustrating exposure control operations.

FIG. 6 is a main flowchart illustrating the photographing operation of the camera 100. When the release button of the camera 100 is half-depressed and the photometry switch SWS is turned ON, the multi-point distance measuring unit 8 executes distance measuring of an object (S102).

When the camera 100 operates in a manual distance measuring mode, one of the three distance measuring points PC, PR or PL is selected by a photographer. The distance measuring point may be selected by operating an operable member provided to the camera 100. In such a case, the controller 20 receives the output signal corresponding to the selected one of the distance measuring points from the distance measuring unit 8, and based on the received signal, the controller 20 determines a driving amount of the AF unit 14, and drives the AF unit 14 to perform an AF operation, whereby the photographing lens 2 is located at a position where an object at the selected distance measuring point is focused.

When the camera 100 operates in an automatic distance measuring mode, the controller 20 receives, from the multi-point distance measuring unit 8, the signal corresponding to a target point which is determined in advance according to the predetermined algorithm. The target point may be, for example, a point corresponding to the nearest object distance. Then the controller 20 executes focusing operation (i.e., drives the photographing lens 2) to focus on the object at the target point. An example of the algorithm for determining the target point is disclosed in U.S. Pat. No. 4,882,601, and teachings of which are incorporated herein by reference.

Next, in step S103, the controller 20 receives, among the photometric values measured by each of the four photometric elements 9D, 9R, 9B and 9G, a value corresponding to one of the photometric areas AC, AR and AL including the target point (i.e., the determined one of the distance measuring points PC, PR and PL), which are selected/determined in S102. Then, in S104, an exposure value EV' is determined in accordance with the photometric value detected by the photometer 13 (i.e., the photometric element 9D) which is provided with no color filter. This exposure value EV' is a value obtained when the reflectance of the subject is supposed to be 18%.

Next, in S105, a colorimetric process is performed. That is, the controller 20 receives, among the photometric values of each of the photometric elements 9R, 9G, and 9B, which are provided with color filters, the photometric values corresponding to the photometric area including the target point (i.e., the selected one of the distance measuring points PC, PR or PL), which is selected in S102. Then, by comparing the photometric values of the photometric elements 9R, 9G and 9B, the light from the object at the distance measuring point is spectrally analyzed, and the color of the object at the target point is determined in accordance with the analyzed results (S105).

Figure 8:
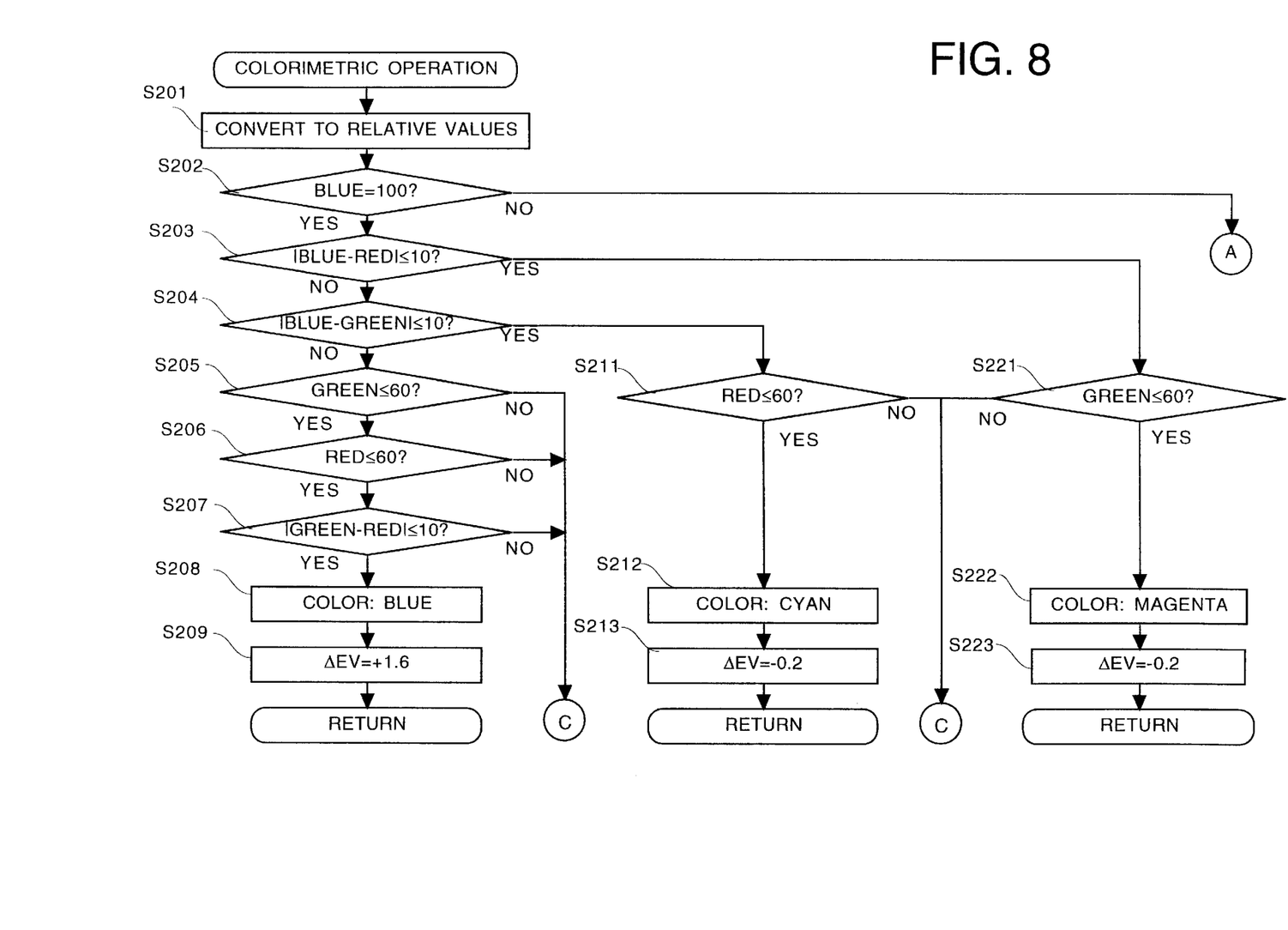
FIGS. 8, 9, 10 and 11 show a flowchart illustrating a colorimetric operation according to an embodiment of the present invention.
Figure 9:
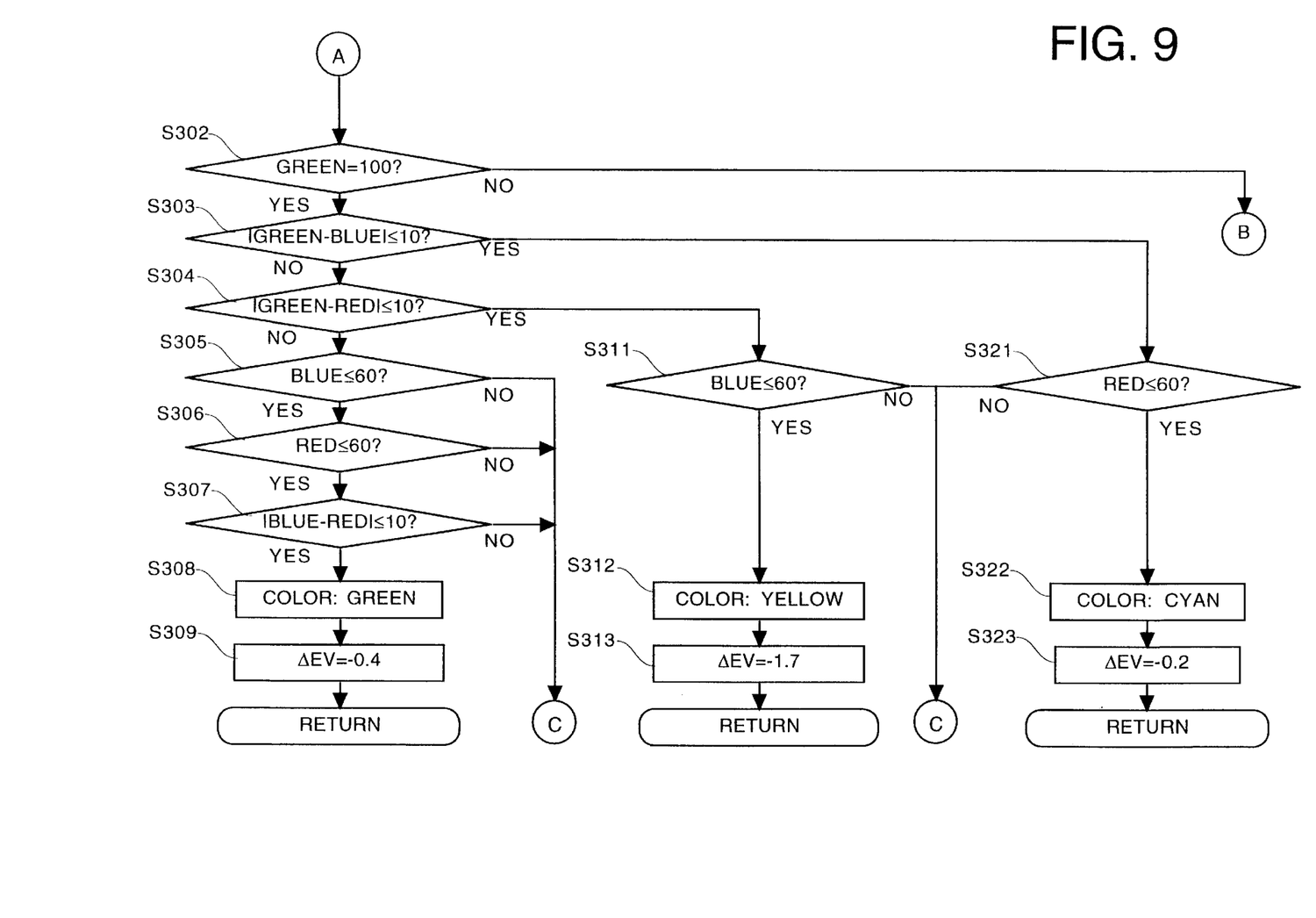
Figure 10:
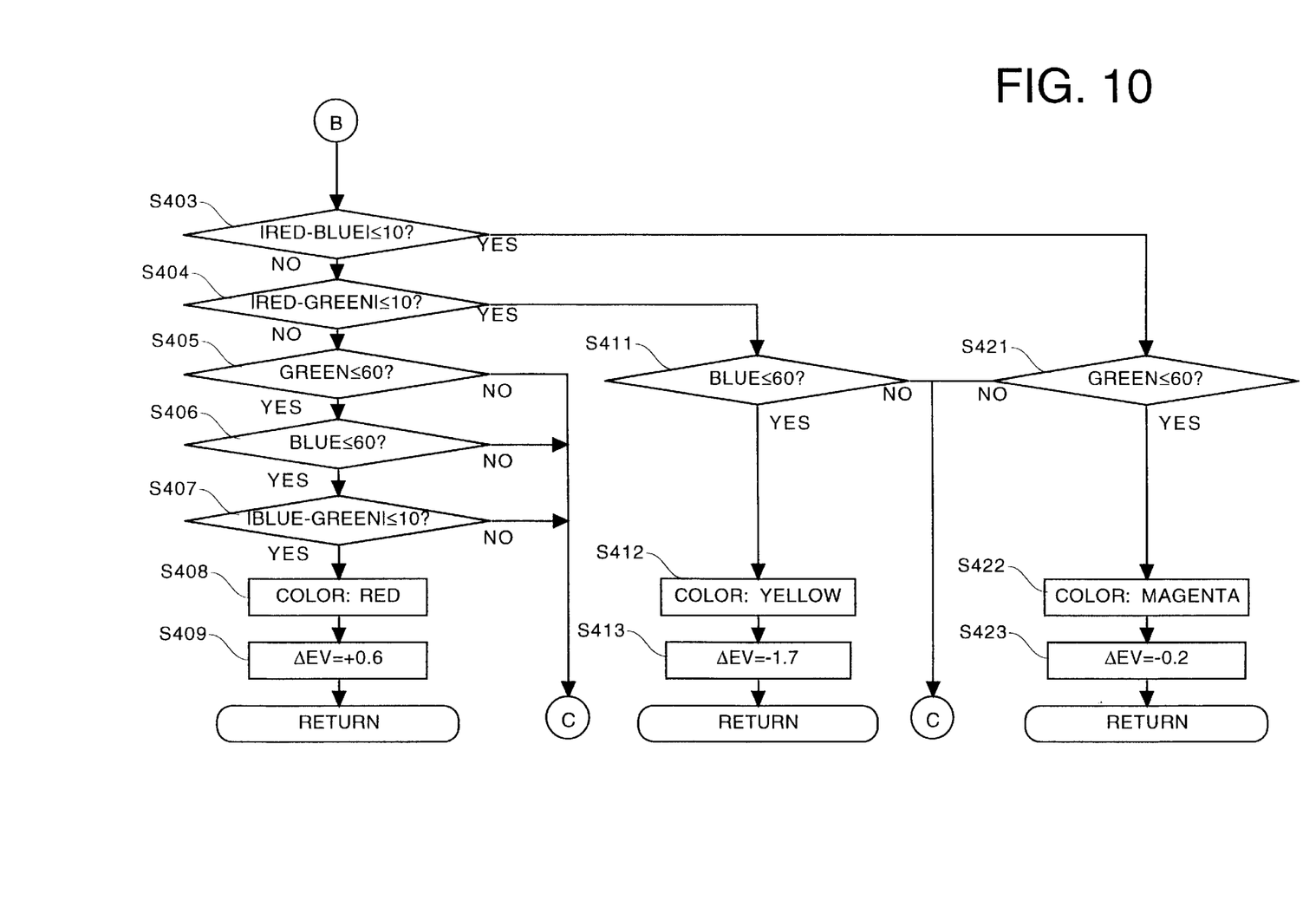

This colorimetric process (S105) is illustrated in detail in the flowchart shown in FIG. 8 through FIG. 10.

In the colorimetric process, one of the photometric elements 9R, 9G and 9B which outputs the greatest photometric value is determined. Then, the photometric values of the other two of the photometric elements 9R, 9G and 9B are converted into relative values (S201) with assuming the greatest value equals to 100. Then, in the following steps, the color of the object is determined (see FIGS. 8–11).

If the relative photometric value corresponding to the photometric element 9B (hereinafter, referred to as BLUE output) is equal to 100 (S202: YES), control proceeds to S203 where it is judged whether the absolute value of a difference between the BLUE output and the relative photometric value corresponding to the photometric element 9R (hereinafter, referred to as RED output) is less than or equal to 10. If the absolute value of a difference between the BLUE output and the RED output is not less than or equal to 10 (S203: NO), control proceeds to S204 where it is judged whether the absolute value of a difference between the BLUE output and the relative photometric value corresponding to the photometric element 9G (hereinafter, referred to as GREEN output) is less than or equal to 10. If the absolute value of a difference between the BLUE output and the GREEN output is not less than or equal to 10 (S204: NO), control proceeds to S205 where it is judged whether the GREEN output is less than or equal to 60. If the GREEN output is less than or equal to 60 (S205: YES), it is judged whether the RED output is less than or equal to 60 (S206). If the RED output is less than or equal to 60 (S206: YES), it is judged whether the absolute value of a difference between the GREEN output and the RED output is less than or equal to 10 (S207). If the absolute value of the difference between the GREEN output and the RED output is equal to or less than 10 (S207: YES), the color is judged to be blue (S208). In this case, the correction value ΔEV is set to +1.6, which is derived from the memory 21.

In other words, the color is determined to be BLUE, when:

(1) the BLUE output is equal to 100 (hereinafter, indicated as BLUE=100);

(2) GREEN≦60;

(3) RED≦60; and (4) |GREEN−RED|≦10.

If, at S203, the absolute value of the difference between the BLUE output and the RED output is less than or equal to 10 (S203: YES), it is judged at S221 whether the GREEN output is less than or equal to 60. If the GREEN output is less than or equal to 60 (S221: YES), the color is determined to be MAGENTA (S222). In this case, the correction value ΔEV is set to −0.2, which is derived from the memory 21.

In other words, the color is determined to be MAGENTA, when:

(1) BLUE=100;

(2) |BLUE−RED|≦10 (i.e., RED≧90); and (3) GREEN≦60.

If, at S204, the absolute value of the difference between the BLUE output and the GREEN output is less than or equal to 10 (S204: YES), it is judged at S211 whether the RED output is less than or equal to 60.

If the RED output is less than or equal to 60 (S211: YES), the color is determined to be CYAN (S212). In this case, the correction value ΔEV is set to −0.2, which is derived from the memory 21.

In other words, the color is determined to be CYAN, when:

(1) BLUE=100;

(2) |BLUE−GREEN|≦10 (i.e., GREEN≧90); and (3) RED≦60.

If the BLUE output is equal to 100 (S202: YES), but the color is not determined to be BLUE, CYAN or MAGENTA, control proceeds to S501 (see FIG. 11) where the color is determined to be ACHROMATIC. In this case, the correction value ΔEV is determined to be zero (S502).

If the BLUE output is not equal to 100 (S202: NO), control proceeds to S302 of FIG. 9.

If the GREEN output is equal to 100 (S302: YES), the absolute value of a difference between the GREEN output and the BLUE output is not less than or equal to 10 (S303: NO), the absolute value of a difference between the GREEN output and the RED output is not less than or equal to 10 (S304: NO), the BLUE output is less than or equal to 60 (S305: YES), the RED output is less than or equal to 60 (S306: YES), and the absolute value of the difference between the BLUE output and the RED output is less than or equal to 10 (S307: YES), the color is judged to be GREEN (S308). In this case, the correction value ΔEV is set to −0.4, which is derived from the memory 21.

In other words, the color is determined to be GREEN, when:
(1) GREEN=100;
(2) BLUE≦60;
(3) RED≦60; and
(4) |BLUE−RED|≦10.

If GREEN output is equal to 100 (S302: YES), the absolute value of the difference between the GREEN output and the BLUE output is less than or equal to 10 (S303: YES), and the RED output is less than or equal to 60 (S321: YES), the color is determined to be CYAN (S322). In this case, the correction value ΔEV is set to −0.2, which is derived from the memory 21.

In other words, the color is determined to be MAGENTA, when:
(1) GREEN=100;
(2) |GREEN−BLUE|≦10 (i.e., BLUE≧90); and
(3) RED≦60.

If the GREEN output is equal to 100 (S302: YES), the absolute value of the difference between the GREEN output and the BLUE output is not less than or equal to 10 (S303: NO), the absolute value of the difference between the GREEN output and the RED output is less than or equal to 10 (S304: YES), and the BLUE output is less than or equal to 60 (S311: YES), the color is determined to be YELLOW (S312). In this case, the correction value ΔEV is set to −1.7, which is derived from the memory 21.

In other words, the color is determined to be YELLOW, when:
(1) GREEN=100;
(2) |GREEN−RED|≦10 (i.e., RED≧90); and
(3) BLUE≦60.

Figure 11:
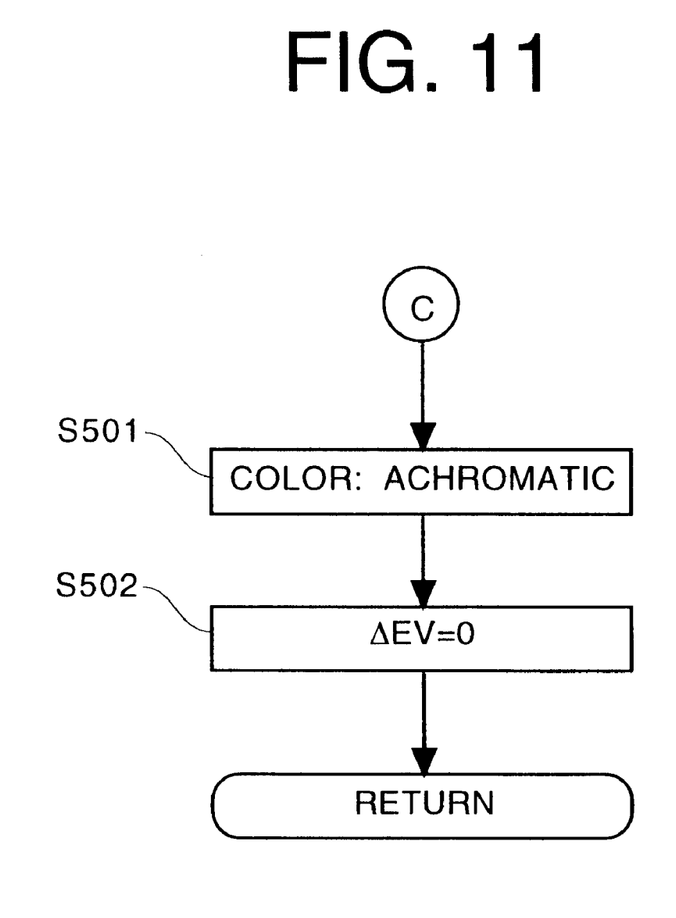

If the GREEN output is equal to 100 (S302: YES), but the color is not determined to be GREEN, YELLOW or CYAN, control proceeds to S501 where the color is determined to be ACHROMATIC. In this case, the correction value ΔEV is determined to be zero (S502).

If the GREEN output is not equal to 100 (S302: NO), control proceeds to S403 of FIG. 10.

If the BLUE output is not equal to 100 (S202: NO) and the GREEN output is not equal to 100 (S302: NO), the absolute value of a difference between the RED output and the BLUE output is not less than or equal to 10 (S403: NO), the absolute value of a difference between the RED output and the GREEN output is not less than or equal to 10 (S404: NO), the GREEN output is less than or equal to 60 (S405: YES), the BLUE output is less than or equal to 60 (S406: YES), and the absolute value of the BLUE output and the GREEN output is less than or equal to 10 (S407: YES), the color is judged to be RED (S408). In this case, the correction value ΔEV is set to +0.6, which is derived from the memory 21.

In other words, the color is determined to be RED, when:
(1) RED=100;
(2) BLUE≦60;
(3) GREEN≦60; and
(4) |BLUE−GREEN|≦10.

If the RED output is equal to 100 (S202: NO; S302: NO), the absolute value of the difference between the RED output and the BLUE output is less than or equal to 10 (S403: YES), and the GREEN output is less than or equal to 60 (S421: YES), the color is determined to be MAGENTA (S422). In this case, the correction value ΔEV is set to −0.2, which is derived from the memory 21.

In other words, the color is determined to be MAGENTA, when:
(1) RED=100;
(2) |RED−BLUE|≦10 (i.e., BLUE≧90); and
(3) GREEN≦60.

If the RED output is equal to 100 (S202: NO; S302: NO), the absolute value of the difference between the RED output and the BLUE output is not less than or equal to 10 (S403: NO), the absolute value of the difference between the RED output and the GREEN output is less than or equal to 10 (S404: YES), and the BLUE output is less than or equal to 60 (S411: YES), the color is determined to be YELLOW (S412). In this case, the correction value ΔEV is set to −1.7, which is derived from the memory 21.

In other words, the color is determined to be YELLOW, when:
(1) RED=100;
(2) |RED−GREEN|≦10 (i.e., GREEN≧90); and
(3) BLUE≦60.

If the RED output is equal to 100 (S202: NO; S302: NO), but the color is not determined to be RED, YELLOW or MAGENTA, control proceeds to S501 where the color is determined to be ACHROMATIC. In this case, the correction value ΔEV is determined to be zero.

Figure 7A:
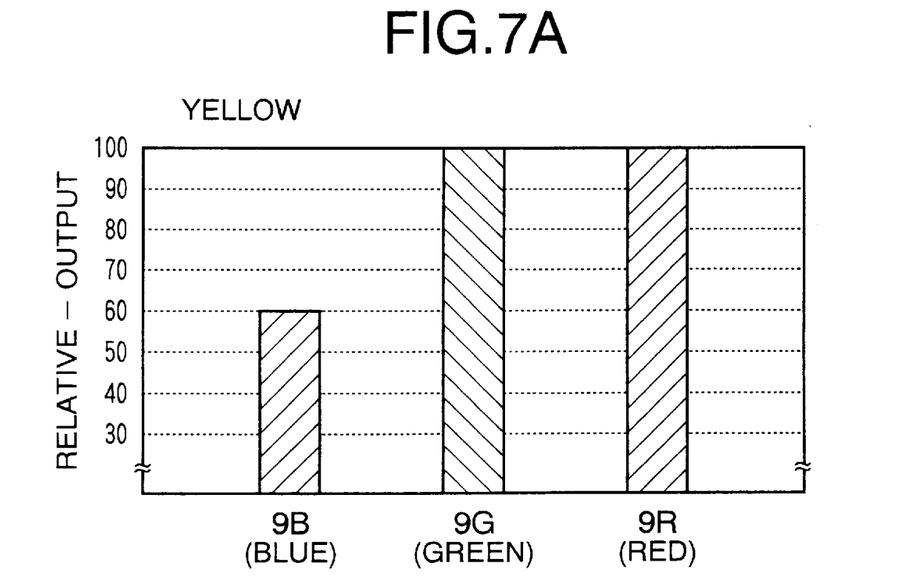
FIGS. 7A and 7B are graphs showing outputs of the photometry elements.
Figure 7B:
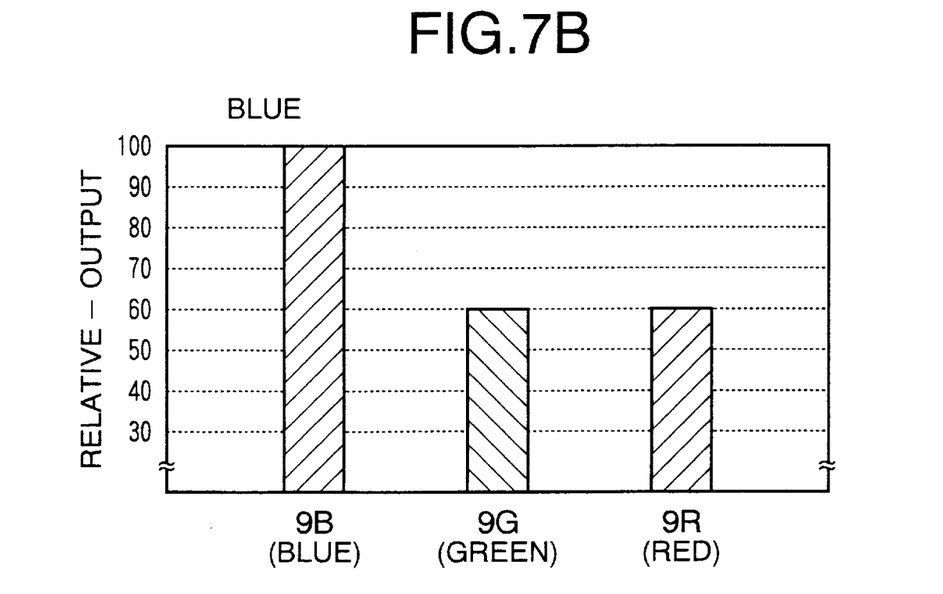

For example, if the RED, GREEN and BLUE outputs (relative values) have the values indicated in FIG. 7A, the controller 20 judges that the color of the object is yellow. If the RED, GREEN and BLUE outputs (relative values) have the values indicated in FIG. 7B, the controller 20 judges that the color of the object is blue.

In step S106 (FIG. 6), in accordance with the results of colorimetry operation, a photometric correcting calculation is performed in which the exposure value EV' obtained in step S104 and the correction value ΔEV determined during the colorimetric operation (FIGS. 8–11) are added, whereby the corrected optimum exposure value EV is obtained. The correction value ΔEV, which are set during the colorimetric operation, is determined in advance according to the difference in reflectance between a plurality of different colors, and the values are stored in the memory 21. A relationship between the colors, reflectance values and the correction values ΔEV are indicated in TABLE 1. At steps S209, S213, S223, S309, S313, S323, S409, S413, and S123 in FIGS. 8–10, the correction values ΔEV, which are stored in the memory 21 and indicated in TABLE 1 are referred to.

TABLE 1

| color | reflectance | correction values ΔEV |
| --- | --- | --- |
| YELLOW | 60% | −1.7 |
| MAGENTA | 20% | −0.2 |
| CYAN | 20% | −0.2 |
| BLUE | 6% | +1.6 |
| GREEN | 23% | −0.4 |
| RED | 12% | +0.6 |

Thereafter, if the release switch SWR is turned ON (i.e., the release button of the camera 100 is fully depressed)

(S107: YES), the exposure parameters (i.e., the shutter speed and the aperture value) is calculated based on the optimum exposure value EV obtained at S106, and based on the calculated exposure parameters, exposure control is performed by the exposure control unit 15 (S108).

According to the above procedure, the optimum exposure value is determined in accordance with the color of the object corresponding to the selected distance measuring point, and the exposure parameters are determined. Therefore, for example, if the color of an object at the point where the distance is measured is yellow, the correction value ΔEV is determined to be −1.7. Accordingly, the optimum exposure value EV is lower than the measured exposure value EV' by 1.7, and therefore, the obtained exposure parameters to be used for photographing have been modified such that the underexposure condition is prevented. For another example, if the color of the object at the point where the distance is measured is blue, the correction value ΔEV is determined to be +1.6. Accordingly, the optimum exposure value EV is modified to be greater than the measured exposure value EV' by 1.6, and therefore, the obtained exposure parameters to be used for photographing have been modified such that the overexposed condition is prevented. As above, according to the embodiment, inaccurate exposure condition due to differences in the color of the subject can be prevented, and photographing can be performed at an optimum exposure condition.

It should be noted that the correction values are not necessarily be stored in the memory 21, but may be assigned by the algorithm. However, by using the memory 21 and referring to the stored values, the correction values can easily be changed, when necessary, without changing the algorithm.

In the embodiment, colorimetry operation is performed based on the outputs of the photometric elements 9R, 9B and 9G, and the exposure correction value ΔEV is determined in accordance with the obtained color, with reference to TABLE 1. However, the invention is not limited to this embodiment. For example, the exposure correction value ΔEV can be directly calculated on the basis of the outputs from the photometric elements 9R, 9B and 9G.

Specifically, at S209, the exposure correction value ΔEV is determined with reference to TABLE 1. However, at S209, instead of referring to memory 21, the exposure correction value ΔEV can be calculated in accordance with formula (F1) below:

$$\Delta EV = (BLUE-((GREEN+RED)/2))*0.025+0.6 \quad (F1)$$

where, 0.025 is a calculation coefficient, and 0.6 is a correction value when the color is blue.

If calculation is performed on the assumption that Blue output=100, Green output=60 and Red output=60, the result is that ΔEV=+1.6, which corresponds to ΔEV indicated in TABLE 1.

Similarly, either step S313 or S413 can be replaced with formula (F2):

$$\Delta EV = (((GREEN+RED)/2-BLUE)*0.025+0.7)*(-1) \quad (F2)$$

where, 0.025 is a calculation coefficient, and 0.7 is a correction value when the color is yellow. Sign is reversed by multiplying (−1) since the exposure value is compensated in a direction where photographing is performed at the overexposed condition.

S309 can be replaced with formula (F3):

$$\Delta EV = ((GREEN-((RED+BLUE)/2))*0.025-0.6)*(-1) \quad (F3)$$

where, 0.025 is a calculation coefficient, and −0.6 is a correction value when the color is green.

If calculation is performed on the assumption that Blue output=60, Green output=100 and Red output=60, the result is that ΔEV=−0.4, which corresponds to ΔEV indicated in TABLE 1.

Each of steps S223 and S423 can be replaced with formula (F4):

$$\Delta EV = ((((RED+BLUE)/2)-GREEN)*0.025-0.8)*(-1) \quad (F4)$$

where, 0.025 is a calculation coefficient, and −0.8 is a correction value when the color is magenta.

S409 can be replaced with formula (F5):

$$\Delta EV = (RED-((BLUE+GREEN)/2))*0.025-0.4 \quad (F5)$$

where, 0.025 is a calculation coefficient, and −0.4 is a correction value when the color is red.

S213 and S323 can be replaced with formula (F6):

$$\Delta EV = ((((BLUE+GREEN)/2)-RED)*0.025-0.8)*(-1) \quad (F6)$$

where, 0.025 is a calculation coefficient, and −0.8 is a correction value when the color is cyan.

Since the correction value ΔEV can be obtained by calculation, a memory for storing ΔEV is not necessary. Further, in this modification, the exposure correction values ΔEV corresponding not only to the color but also to the quantity of the received light can be obtained.

It should be noted that, in the above modification, the memory 21 may be used for storing coefficients and correction values for formulae F1–F6. If such values are stored in the memory 21, when it becomes necessary to change the coefficients and/or correction values, they can be changed relatively easily merely by re-storing the values, without changing the algorithm.

The present invention can also be modified in various ways.

If the invention is to be applied to a camera provided with only one distance measuring point, the photometric point and the colorimetric point may be defined to coincide with the distance measuring point.

The colorimetric points need not coincide with the distance measuring points. In particular, in a camera in which the photometric areas are wider than areas defined for distance measuring, it is preferable that the colorimetric operation is performed with respect to the photometric areas.

In the above-described embodiment and modification, the correction value ΔEV is determined on the basis of photometry at a distance measuring point, however, the invention can be applied to a camera without a distance measuring unit.

Furthermore, the invention is not limited to a single lens reflex camera or a camera using a photosensitive film, but is applicable to a digital camera.

As described above, since the camera according to the invention is equipped with a colorimeter for detecting the color of an object, and performs exposure control by correcting the exposure value measured by a photometer in accordance with the color measured by the calorimeter, over- or under-exposure condition due to differences in light reflectance based on differences in the color of the object are eliminated, whereby it becomes possible to obtain optimum exposure parameters. In particular, in the invention, photometry and colorimetry are performed at a distance measuring point at which the distance to an object is measured. Thus, a portion of an object which is focused on is photographed at the optimum exposure condition.

The present disclosure relates to the subject matter contained in Japanese Patent Application No. HEI 10-227817, filed on Aug. 12, 1998, which is expressly incorporated herein by reference in its entirety.

What is claimed is:

1. A camera, comprising:

a photometry device that detects brightness of an object;

a colorimetry device that detects a color of the object;

a controller that determines an exposure value in accordance with an output of said photometry device, said controller compensating said exposure value in accordance with the color of the object detected by said colorimetry device; and a distance measuring device capable of detecting a distance to the object at a plurality of distance measuring points defined within a photographing frame of said camera, wherein said photometry device is capable of detecting the brightness of the object at any area, within said photographing frame, which respectively include said plurality of distance measuring points, and wherein said colorimetry device is capable of detecting the color of the object at any area, within said photographing frame, which respectively include said plurality of distance measuring points, the distance to the object being detected with respect to a selected one of said plurality of distance measuring points, the exposure value being detected at an area corresponding to said selected one of said plurality of distance measuring points, and the color of the object being detected at an area corresponding to said selected one of said plurality of distance measuring points.

2. The camera according to claim 1, wherein said controller includes a storing device that stores a plurality of compensation values corresponding to a plurality of colors, said controller compensating said exposure value by adding a compensation value corresponding to the color of said object stored in said storing device.

3. The camera according to claim 1, further comprising a distance measuring device which detects a distance to said object at a predetermined point within a photographing frame, wherein said photometry device detects the brightness of said object at an area, within said photographing frame, which includes said predetermined point, and wherein said colorimetry device detects the color of said object at an area, within said photograhing frame, which includes said predetermined point.

4. The camera according to claim 1, wherein said controller directly calculates an exposure compensation value on the basis of the color of the object detected by the colorimetry device.

5. The camera according to claim 1, wherein said colorimetry device includes:

a plurality of photometric elements for measuring amount of received light having different wavelength ranges; and a color determining system that determines the color based on the light amount values detected by said plurality of photometric elements.

6. An exposure control system for a camera, comprising:

a photometry device that detects brightness of an object;

a colorimetry device that detects a color of the object;

a controller that determines an exposure value in accordance with output of said photometry device, said controller compensating said exposure value in accordance with the color of the object detected by said colorimetry device; and a distance measuring device capable of detecting a distance to the object at a plurality of distance measuring points defined within a photographing frame of said camera, wherein said photometry device is capable of detecting the brightness of the object at any area, within said photographing frame, which is respectively include said plurality of distance measuring points, and wherein said colorimetry device is capable of detecting the color of the object at any area, within said photographing frame, which respectively include said plurality of distance measuring points, the distance to the object being detected with respect to a selected one of said plurality of distance measuring points, the exposure value being at an area corresponding to said selected one of said plurality of distance measuring points, and the color of the object being detected at an area corresponding to said selected one of said plurality of distance measuring points.

* * * * *